United States Patent Office.

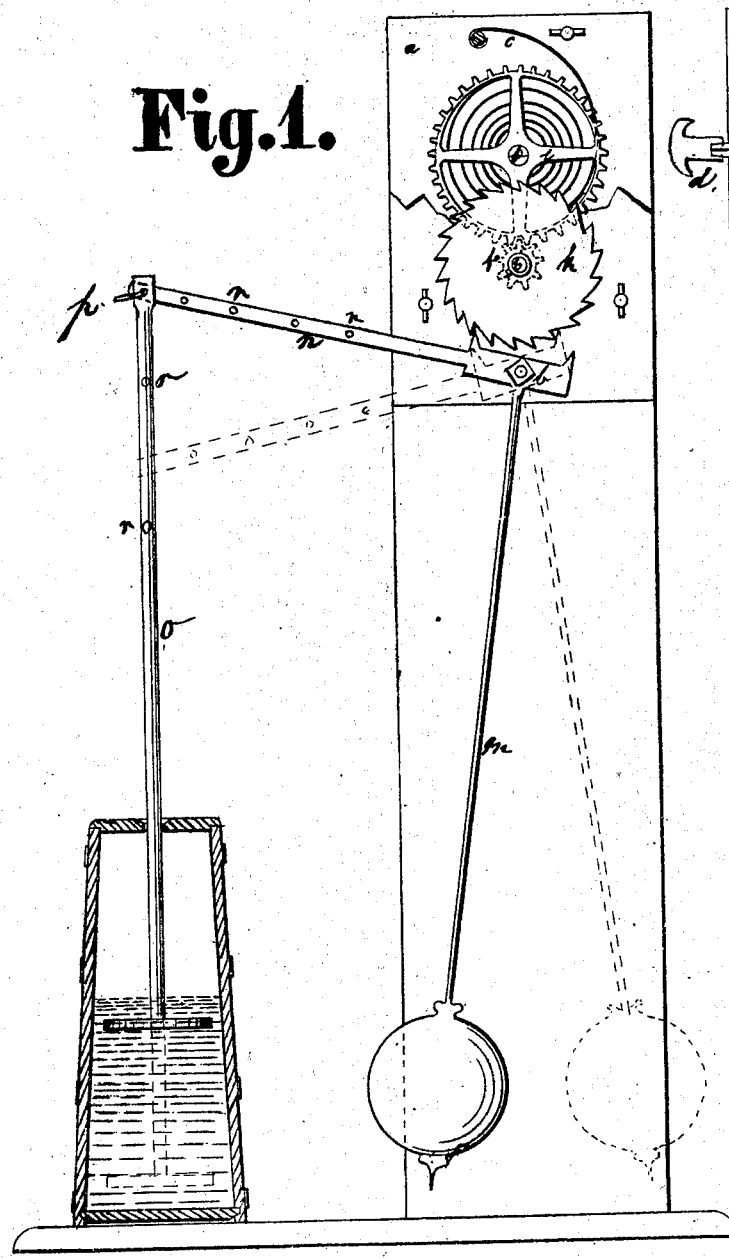
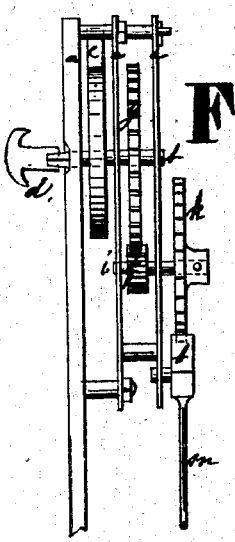

JAMES H. MONCE, OF HOPKINSVILLE, OHIO.

Letters Patent No. 74,114, dated February 4, 1868.

IMPROVEMENT IN MANNER OF WORKING CHURNS.

*The Schedule referred to in these Letters Patent and making part of the same.*

TO ALL WHOM IT MAY CONCERN:

Be it known that I, JAMES H. MONCE, of Hopkinsville, in the county of Warren, and State of Ohio, have invented a new and improved Manner of Working Churns; and I do hereby declare that the following is a full, clear, and exact description of the construction and operation of the same, reference being had to the annexed drawings, making a part of this specification, in which—

Figure 1 is a front view of the power and churn attached.

Figure 2 is an end or side view of the power.

The object of my invention is to relieve the toil, so irksome to the female portion of our households, of doing the churning, by supplying them with a simple power to do the work.

The nature of my invention consists in the arrangement and combination of the pendulum, arm, and dasher, as operated by the verge and clock-work, the arm and dasher-handle or lever having apertures, for the purpose of regulating the length or shortness of the stroke, so as to regulate the speed in operating the churn, the churn being an upright churn.

To enable others skilled in the art to make and use my invention, I will proceed to describe its construction and operation.

$a$ $a$ are plates, held apart by studs, which form a frame to hold the different parts of the machine. $b$ is a spindle, on which there are a ratchet-wheel and dog. Around the spindle $b$ there is a spring, $c$, which, when the spindle $b$ is turned by key $d$, is contracted or tightened around the spindle $b$; then, by its elastic force, acting against the ratchet, the machine is set in motion. On the spindle $b$ there is a large spur or cog-wheel, $g$, which works into a pinion, $f$, on spindle $i$. On spindle $i$ is a ratchet-wheel, $k$, into which a verge, $l$, works. Attached to the verge is a rod and pendulum, $m$. At right angles with the pendulum-rod, and attached to the verge $b$, there extends an arm, $n$, which is attached to the churn-dasher $o$, and imparts the necessary motion thereto, which may be a simple up-and-down motion, as in the ordinary dasher-churns.

The whole operation of the machine is simple. It is wound up as an ordinary clock. The spring is the driving-power that propels the gearing-devices that give the motion to the verge $b$, arm $n$, and dasher-handle $o$, attached thereto, the arm $n$ and dasher $o$ being regulated in their stroke by inserting the pin $p$ into the apertures $r$.

I do not claim as my invention, the use of clock-work as the driving-power, but

What I claim as my invention, and desire to secure by Letters Patent, is—

The arrangement and combination of the regulating and adjustable arm $n$ and dasher, adjustable lever $o$, when connected with and operated by the verge $b$, as herein described and for the purposes set forth.

JAS. H. MONCE.

Witnesses:
J. FRANKLIN REIGART,
H. N. CORSS.